(12) United States Patent
Skjegstad et al.

(10) Patent No.: US 8,982,907 B2
(45) Date of Patent: Mar. 17, 2015

(54) LARGE-SCALE PEER-TO-PEER DISCOVERY MECHANISM FOR FREQUENCY ALLOCATION

(75) Inventors: Magnus Skjegstad, Oslo (NO); Brage Ellingsaeter, Oslo (NO); Torleiv Maseng, Oslo (NO)

(73) Assignee: Forsvarets Forskningsinstitutt, Kjeller (NO)

( * ) Notice: Subject to any disclaimer, the term of this patent is extended or adjusted under 35 U.S.C. 154(b) by 103 days.

(21) Appl. No.: 13/546,890

(22) Filed: Jul. 11, 2012

(65) Prior Publication Data

US 2014/0016484 A1  Jan. 16, 2014

(51) Int. Cl.
*H04J 3/00* (2006.01)
*H04W 72/08* (2009.01)

(52) U.S. Cl.
CPC .................................. *H04W 72/082* (2013.01)
USPC ........................................................ 370/464

(58) Field of Classification Search
USPC ............ 348/725, 731, 732; 455/7, 11.1, 12.1, 455/13.4; 370/464–467
See application file for complete search history.

(56) References Cited

U.S. PATENT DOCUMENTS

| | | | |
|---|---|---|---|
| 7,676,236 B2 * | 3/2010 | Nanda et al. ................... | 455/509 |
| 2008/0089306 A1 | 4/2008 | Hu | |
| 2010/0075704 A1 | 3/2010 | McHenry et al. | |
| 2011/0170440 A1 | 7/2011 | Gaal et al. | |
| 2012/0195212 A1 * | 8/2012 | Zhang et al. ................... | 370/252 |
| 2012/0195269 A1 * | 8/2012 | Kang et al. ..................... | 370/329 |
| 2012/0257585 A1 * | 10/2012 | Sydor et al. ................... | 370/329 |
| 2013/0051279 A1 * | 2/2013 | Lee et al. ....................... | 370/254 |

OTHER PUBLICATIONS

European Search Report for European Application No. 12175936.9 dated Dec. 12, 2012. (7 pages).

* cited by examiner

*Primary Examiner* — Fan Ng
(74) *Attorney, Agent, or Firm* — Osha Liang LLP

(57) ABSTRACT

Method for collecting information from other radio transmitters and/or receivers for the purpose of coordinating and controlling the interference between transmitters and receivers. The method comprises discovering other radio transmitters and receivers in a network. Peer-to-peer communication is used over the Internet when determining relevant neighboring nodes for own communication and performing resource management for the set of radio transmitters and receivers.

9 Claims, 3 Drawing Sheets

LARGE-SCALE PEER-TO-PEER DISCOVERY MECHANISM FOR FREQUENCY ALLOCATION

INTRODUCTION

The present invention relates to radio devices connected through a communication network. More specifically the invention relates to resource management and how to discover radio transmitters and receivers in order to coordinate transmissions in a way which permits many users to use a limited radio spectrum.

BACKGROUND AND PRIOR ART

The part of the radio frequency spectrum suitable for mobile and wireless services is limited and already occupied by other services in most countries. First came radio, then television, and then the mobile networks which have a growing demand for more bandwidth. Fixed Internet connections via for instance optical fibers provide plenty of capacity. Users expect wireless networks to offer the same. This is however a dilemma due to sharing of the capacity of cells comprised in the wireless network. In order to solve this dilemma, it is necessary to make smaller cells and more of them so every user can have access to the entire bandwidth of the operator without sharing it with other users. The consequence is that there will be multiple wireless networks with even shorter range than today.

Because the use of radio spectrum is auctioned by national governments it has become clear that a license for access to spectrum is a valuable resource of great importance to the entire community. This is because access to the Internet is of great national importance for the whole community with respect to settlements, infrastructure and industry. It is further not satisfactory when TV signals takes up much of the most attractive part of the spectrum without using it fully. As a consequence, major research programs all over the world have been initiated to find solutions on how the radio spectrum can be better utilized.

The lack of radio spectrum combined with a growing need for even more spectrum makes it essential to find new ways to use the spectrum. This is further emphasized by the fact that a network of radio devices connected to the Internet will in many cases consist of thousands to tens of thousands of nodes distributed over large areas, even countries. With this vast amount of different radios it is important to be able to find other radio devices to communicate with and also radio devices to coordinate traffic with.

New ways of using the radio spectrum is the subject of standardization within ETSI RRS, IEEE 802.11, IEEE 802.19, 3GPP, IEEE DySPAN and IETF. Much of this work is about how the new radio networks can share the spectrum currently used by TV signals. In the EU Seventh Framework Program FP7, there are several programs that work with co-existence between the TV and a better utilization of the dynamic spectrum. The following projects running in FP7 address new ways of using the radio spectrum: "Quality of Service and Mobility driven cognitive radio systems (QoS-MOS)", "Cognitive radio systems for the efficient sharing of TV white spaces In the European context (COGEU)", "Spectrum and energy efficiency through multi-band cognitive radio (S acre)", "Opportunistic networks and cognitive Management Systems for Efficient Application Provision in the Future Internet (OneFIT), and COST-TERRA.

In the United States DARPA and National Science Foundation has funded several programs on this topic. The White Spaces Coalition group plans to deliver high speed internet access to United States consumers via existing "white space" in unused television frequencies between 54 MHz and 698 MHz (TV Channels 2-51). The group includes Microsoft, Google, Dell, HP, Intel, Philips, Earthlink, and Samsung Electro-Mechanics.

Many publications support the IEEE 802.22 standard in which new WiMAX like radio networks can be established which can coexist with TV's sharing the same band, by being sufficiently far away. This is done by measuring the presence of TV transmission as described in for example US 2010/0075704 A1 or detection of other radio nodes as described in US 2010/0097952 A1. Local transmission at all radio sites can however not be detected. This is described as the "hidden node problem".

The article: N. Ahmed, D. Hadaller, and S. Keshav, "Guess: gossiping updates for efficient spectrum sensing," in Proceedings of the 1st international workshop on Decentralized resource sharing in mobile computing and networking, MobiShare '06, (New York, N.Y., USA), pp. 12-17, ACM, 2006, is based on distributing spectral sensing between multiple nodes as described in U.S. Pat. No. 7,738,890, US 2007/0253394 A1, and sharing information by a peer-to-peer (P2P) protocol in which spectrum sensing information by neighbor nodes for the purpose of resolving the "hidden node problem" and determine if TV transmission is present or not. This approach is different from the present invention in that it is based on effectively sharing spectral sensing information, not discovering other nodes over the Internet.

Several other patent publications like for instance US 2010/0136997 A1 use P2P in a different way than in the present invention. In the present invention P2P refers to communication between end nodes over the Internet forming a logical network or overlay. In US 2010/0136997 A1 P2P is used when there is direct communication between mobile units without using a base station like in Qualcomm proprietary technology FlashLinq which is built into its radios that allows devices to automatically discover thousands of other FlashLinq enabled devices within 1 kilometer and share a broadband connection with them. The difference between this technique and that of the present invention, is that FlashLinq uses radio, while the present invention uses Internet. FlashLinq provides direct radio connectivity between mobile terminals (user equipment) while the present invention provide communication through radios connected to Internet. Another technology is Wi-Fi Direct, which establish direct point to point links by Wi-Fi radio and therefore not related for the present invention.

Related US patent publications use dedicated control channels rather than Internet to coordinate the use of radio resources, e.g. U.S. Pat. No. 7,894,821, US 2008/0089306 A1, US 2010/0075704 A1. These claims are limited to be used within networks composed of specific nodes which is quite different from the method used in the present invention which only require a generic application running on any radio node with Internet connectivity.

The use of a transmitted beacon is a good way to determine the path loss between a transmitter and a receiver. This parameter is also commonly used for resource allocation. Beacon measurements can also be used as a method to determine which radio nodes are relevant for resource allocation as described in US 2006/0286934 A1. This is an alternative solution, but it is quite different from the method of the present invention, which determines the most relevant nodes for which coordination is performed, using the Internet and location information.

Prior art does not provide an efficient solution to the problem of efficient sharing of the TV spectrum with regards to solving the "hidden node problem" without the use of central databases which do not scale as the traffic increases.

The present invention defines a method for improved allocation of all available network resources by discovering radio nodes such as routers and wireless base stations for mobile systems, like femtocells connected to Internet. The method allows the sharing of a radio spectrum with radio nodes like TVs. By using this method, "the hidden node problem" which occurs when a transmitter disturbs a local receiver without being aware of its presence will be avoided.

The inventive method uses Internet to find the most relevant transmitters and receivers to exchange information and coordinate resources within their area to achieve an optimal utilization of the radio spectrum. The method is suitable to be implemented as a computer program performing the inventive method when run on a processor executing the different steps of the method. The processor used for this can be one that is included in small base stations. The method requires little additional use of the Internet capacity.

SHORT DESCRIPTION OF THE INVENTION

The present invention describes a method discovering and coordinating radio devices connected to a network for the purpose of controlling interference and coordinating wireless communication between receiver and/or transmitter nodes. The method is defined by the following steps:

- from each node collecting information related to neighboring receiver and/or transmitter nodes by peer to peer communication over the network, and
- determining relevant interfering neighboring receiver and/or transmitter nodes for transmission from each node, and
- performing resource management for receiver and/or transmitter nodes discovered.

Other features of the inventive method are defined by the dependent claims.

DETAILED DESCRIPTION OF THE INVENTION

The invention will now be explained in detail with reference to the drawings in which.

The purpose of the present invention is to provide a method for discovering and coordinating radio devices connected to a network for the purpose of controlling interference and coordinating wireless communication between receiver and/or transmitter node. The expression and/or is used to denote that some nodes only receive, some nodes only transmit, while some nodes both transmit and receive.

The method comprises the use of a network comprising several nodes. The network must provide end-to-end connectivity between the nodes, i.e. similar to the Internet. In the following description the Internet is used as an example of a network.

Figure 3:
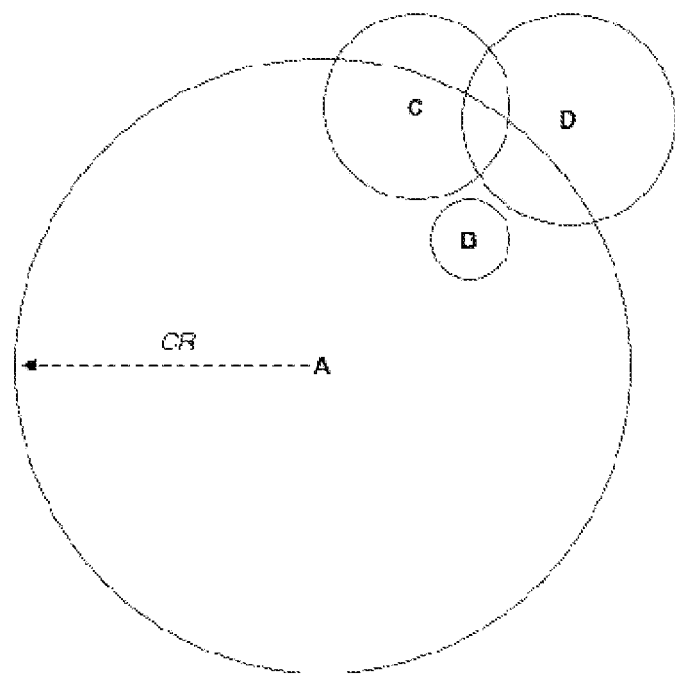
FIG. 3 shows radio nodes A, B, C and D and their coordination areas.

The inventive method comprises a discovery mechanism that will be further described below with reference to FIG. 1. The discovery mechanism is used to find surrounding radio nodes as illustrated in FIG. 3 and is used in conjunction with the resource allocation mechanism as depicted with reference to FIG. 4.

The mechanism for performing the inventive method may reside in a radio node which is a small base station connected to the Internet like Wi-Fi (IEEE 802.11) access points and other wireless access points including the "base and distribution system service" of IEEE 802.11, WRAN (IEEE 802.22) base stations for operation in the TV white spaces, femtocells (LTE and UMTS) and base stations for mobile telephones including "access network discovery information and selection function" of 3GPP networks, mobile wireless devices which contain radio transmitters and receivers that are included in the P2P network for exchange of radio parameters.

Each node collects information related to neighboring receiver and/or transmitter nodes by P2P communication over a network, i.e. the Internet. The method comprises a discovery mechanism (protocol) based on an unstructured P2P overlay network where nodes collects information related to neighboring receiver and or transmitter nodes by P2P communication over the network.

Figure 1:
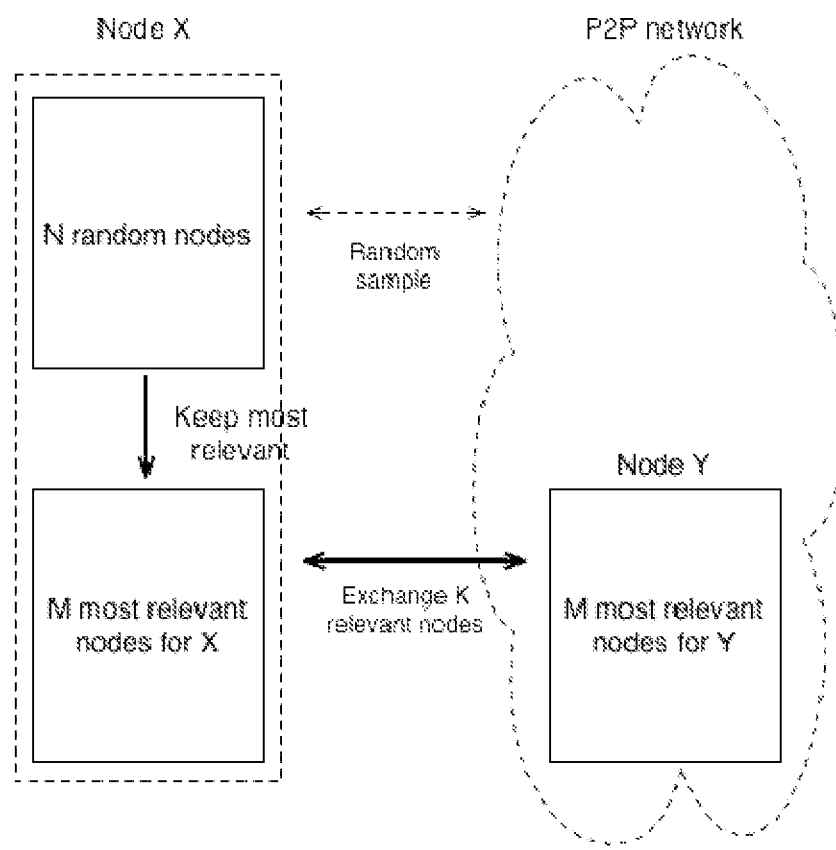
FIG. 1 shows an overview of the two mechanisms of the discovery protocol.

FIG. 1 shows an overview of the two mechanisms of the discovery protocol according to the invention that is defined for discovering the nodes and selecting the most relevant radio nodes connected to a communication network for the purpose of controlling interference and coordinating communication between receiver and/or transmitter nodes.

The first mechanism provides an approximate random sample of all nodes participating in the network. The second mechanism selects the most relevant nodes from the random sample and exchanges neighbor information with them. The most relevant nodes are determined by how likely it is that they will interfere with other radio transmissions in a given geographical area.

An ordered list of most relevant nodes is created by, at certain intervals, choosing an approximate random sample of nodes in the network topology calculating their relevance in terms of interfering with the node, and storing a list of the most relevant information from the most relevant transmitter and/or receiver nodes. The second mechanism of the inventive method is to exchange information about discovered relevant nodes with other relevant nodes by at certain intervals contacting the most relevant or a subset of the most relevant receiver and/or transmitter nodes from which information is maintained in said list and exchanging information parameters about other relevant nodes, and selecting a subset of the nodes about which information shall be exchanged based on relevance if the number of relevant nodes maintained in said list is large The second mechanism reduces the discovery time, as it is likely that nodes that are relevant to each other have discovered information which is relevant to both.

When the random sample is updated by the first mechanism, the relevance of each new node is calculated and compared to already known relevant nodes. The most relevant nodes are added to the information exchanged by the second mechanism.

Relevance of a node can be determined using one or more of the following methods.

Relevant interfering neighboring nodes can be determined in a two-dimensional space by constructing a circular coordination area around each node and computing to what extent the circular coordination areas overlap. The most overlapping area will determine the most relevant neighboring node.

Interfering neighboring nodes can also be determined in a three-dimensional space by constructing a circular coordination volume around each node and computing to what extent the circular coordination volumes overlap and in this way determine the most relevant neighboring node.

Another way is by letting the relevant interfering neighboring nodes be determined in a two-dimensional space by constructing pointing polygons based on their transmission/receiving antenna directionality and computing to what extent the polygons overlap.

Another way of finding this is by letting the relevant interfering neighboring nodes be determined in a three-dimensional space by constructing pointing polygons based on their transmission/receiving antenna directionality and computing to what extent the polygons overlap.

Figure 2:
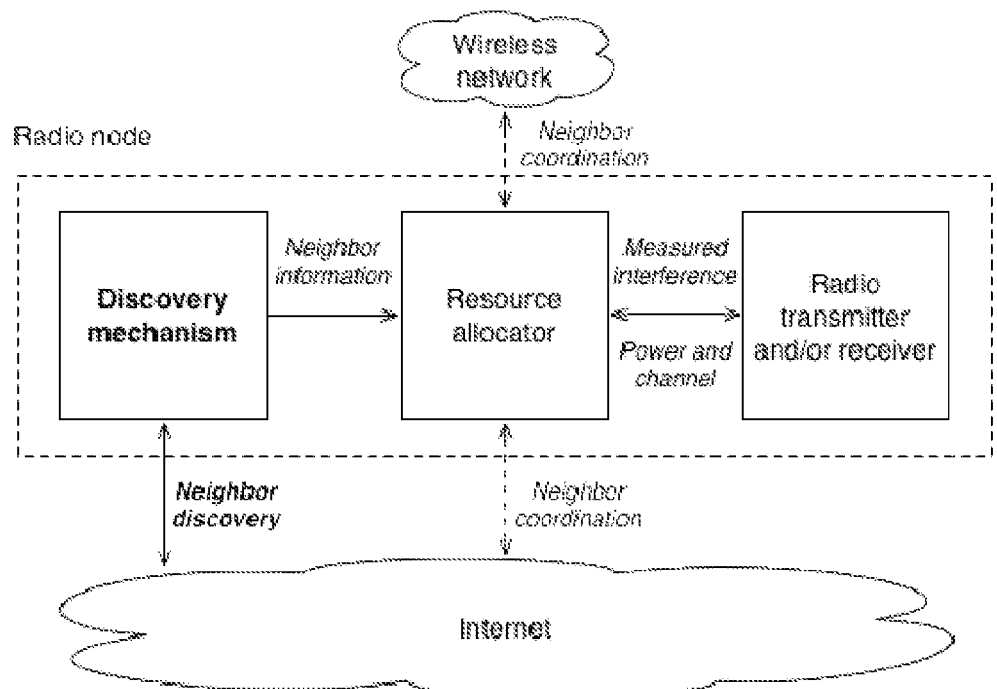
FIG. 2 shows an overview of the discovery architecture.

FIG. 2 shows an overview of the discovery architecture and how the discovery mechanism relates to resource allocation for resource management. The discovery protocol uses the network to find other nodes within coordination range. The resource allocator performs resource allocation based on the information gathered by the discovery protocol and may use the network to retrieve additional information or coordinate with other nodes.

The following paragraphs will explain random sampling.

In order to provide a random sample of the network several existing protocols could be used. To guarantee that all nodes are eventually discovered all nodes in the network must have a chance of appearing in the sample.

In one implementation the Newscast protocol is used to produce an approximate random sample of the network using a gossip-based peer sampling method, as described in the article M. Jelasity, W. Kowalczyk, and M. Van Steen, "Newscast computing," tech. rep., Technical Report IR-CS-006, Vrije Universiteit Amsterdam, Department of Computer Science, Amsterdam, The Netherlands, 2003.

The Newscast protocol is a generic protocol which maintains a table of N known news items. A news item is a data object associated with a timestamp and the network address of the node that produced it. The timestamp is used to discard the oldest items from the table if the length exceeds N items. Periodically, a node 1) stores its own network address in the table with an updated timestamp, and 2) chooses a network address randomly from the table, contacts the P2P node at this address and performs an exchange of news items. After exchanging news items the table contains 2N items and the oldest N entries are removed to reduce the length. This mechanism ensures that nodes have a near random sample of other nodes in the P2P network and that obsolete information expires over time.

To enable discovery based on location, several fields are added to the data object associated with each news item. These fields are: a randomly assigned source node identifier, the geographical location of the source node, and its coordination range. The source node identifier is used to identify the node in the P2P overlay and to allow multiple devices to use the same IP address, while the location and coordination range is used for discovery.

The following paragraphs will explain how relevant nodes are found.

Each node must coordinate resource allocation with other nodes with regards to which nodes may interfere with a node or which nodes may be interfered by the node. This cannot be solved with a regular distance function since nodes far away may interfere with a node, while a node right next to it could be using very low power and not interfere at all.

FIG. 3 shows an example of radio nodes A, B, C and D and their coordination areas or ranges. CR is the coordination radius for node A. The figure shows that nodes C and D may cause interference in the same area and should therefore know about each other. B on the other hand, is outside of both C and D's radio ranges and can safely be ignored by these nodes. A is a strong radio transmitter and interferes with all the other nodes. This example shows that although A is farther away from C and D than B, A is much more relevant in terms of resource allocation for B. The goal of the protocol is thus to enable each node to discover all other nodes which have coordination areas overlapping with their own, i.e. other nodes which may interfere in the same area as themselves. Nodes which have overlapping coordination ranges are called neighbors and these nodes shall be ordered according to their relevance determined by how likely it is that they will interfere with other radio transmissions in a given geographical area using the discovery mechanisms or protocol described with reference to FIG. 1. How this is done is reflected by the method for discovering and coordinating radio devices connected to a network for the purpose of controlling interference and coordinating wireless communication between receiver and/or transmitter nodes, in particular by a method wherein each receiver and or transmitter node maintain a list of information stored in a memory, where the list comprise the most relevant neighboring receiver and or transmitter nodes determined by how likely it is that they will interfere with other radio transmissions in a given geographical area, called most relevant nodes.

For omnidirectional antennas the coordination becomes very simple and is used in the following for explanation even if these ideas can be extended to directional antennas. To determine which other nodes a node should coordinate with a utility function is defined and where this is based on the overlap between coordination ranges. This is used to determine the most relevant neighboring receiver and or transmitter nodes determined by how likely it is that they will interfere with radio transmissions in a given geographical area. If the sum of the coordination ranges of two nodes is higher than the distance between the nodes, their coordination areas overlap. This can be expressed as a function by dividing the square of the sum of the coordination ranges by the distance between the nodes, as shown in the equation below Eq (1). When the areas are overlapping $f(\ )$ is greater than 1, while with no overlap the result is less than 1.

$$f(x_i, y_i, z_i; x_j, y_j, z_j; cr_i, cr_j) = \frac{(cr_i + cr_j)^2}{(x_i - x_j)^2 + (y_i - y_j)^2 + (z_i - z_j)^2} \quad \text{Eq (1)}$$

In the utility function $f(\ )$, often called just utility in the following, $x_{i,j}$, $y_{i,j}$, $z_{i,j}$ and $cr_{i,j}$ are the location and coordination ranges of nodes i and j, respectively. This formula is chosen to put the nodes in the right order according to their relevance, considering that neither the frequency channel nor the transmitter power is known when the node relevance is calculated and the nominator values reflect the highest power possible. The square power exponent is convenient for calculation, but does not reflect the real propagation exponent, but ensures that the nodes are ordered in the right order.

The most relevant nodes are those discovered so far that have the highest utility and correspond to those of highest relevance. When new nodes are discovered using the random sampling technique, their utility is calculated using this equation. The nodes are then added to the table of relevant nodes. This table has a fixed length M and the entries are sorted by the result of the utility function. When adding new nodes to a full table, the nodes at the end of the table (with lowest utility or relevance) are removed. The mechanism ensures that given enough time, the M nodes which have the highest utility are discovered. However, waiting for all neighbors to be discovered randomly can take time in large networks.

As the utility function in Eq (1) is based on distance, it is likely that a node with high utility has information about other nodes of interest in the same area. By periodically exchanging information about relevant nodes in a similar manner as in the random sample, the discovery time can be reduced significantly. At random intervals a random node is therefore selected from the table of most relevant nodes. The node is selected from the top 10 nodes with the highest utility or all nodes with utility >1 if more than 10 nodes with overlapping coordination ranges have been found. Using the utility function, K nodes are then selected from the table of the most relevant to the selected node, where K is lower or equal to M. Next this list is sent to the other node. In return, the other node replies with a list of the K nodes which are the most relevant for the selected node. Finally, both nodes merge the list of K nodes with their table of M entries, deleting the entries with lowest utility.

If the number of overlapping nodes exceeds M, i.e. a node has more than M neighbors with a utility greater than 1, the nodes are not able to discover all their neighbors. By considering all entries with utility greater than 1 as equal and sorting them by age, the oldest entries can be deleted when the table is full. The random sampling mechanism then ensures that all nodes will eventually be discovered, but their entries are not necessarily in the table at the same time. It also leads to an increase in convergence time, as the protocol must rely more on random discovery. When M can be chosen such that it is greater than the maximum number of nodes with utility >1, it leads to the lowest convergence time.

By allowing K to be shorter than M, the bandwidth requirements of the protocol can be kept low, even if M is large.

As the maximum number of nodes with utility >1 is usually unknown and may vary greatly from node to node, it is useful to be able to dynamically adjust the length of the table of relevant nodes. This can be accomplished by creating a table in memory with room for M+K entries, where initially M=K. This ensures that when K entries are received from another node there is always room in memory to store them. After receiving new information, nodes with utility <1 are discarded until the number of items in the table is back to M or there are no more items to discard. If the number of items with utility >1 exceeds M, M is increased by K, i.e. $M_{new}=M_{old}+K$. This effectively increases M in steps of K, while always keeping room for additional K entries. As K is constant, the bandwidth consumption does not increase. The algorithm requires few memory allocations, as the entries in the table can be reused as long as M is not increased.

Offline nodes will now be explained. If a node is not connected to the Internet and is not part of the P2P network, the discovery protocol will not take the node into account unless they are represented by an online node. In this way passive receivers (like TVs) can be taken into account and the resource allocator may include them in the resource allocation process. This can be accomplished by letting a node in the P2P network negotiate on behalf of the passive receivers by including nodes that are TV receivers. These are often called "the primary users of the radio frequencies" while the new users of the TV band are called "secondary users". By including the primary users, they are protected from unintentional interference from the secondary users. This is done by letting a radio node with access to Internet uses the discovery mechanism to allocate radio resources on behalf of a set of offline radio nodes for future use of these radio nodes.

As an example, it can be assumed that a TV broadcaster has been added to the network. The broadcaster has a known location and a very large coordination area, covering all its TV receivers. The broadcaster is discovered as a neighbor by all nodes within the coordination range. The resource allocators in these nodes may then choose to contact the TV broadcaster, or the operator, and ask whether a channel is available in a specific area. It is then up to the operator of the TV broadcaster to allow or deny access to certain channels. As the nodes must ask for access, the operator may optionally require payment for access to certain channels. This gives an economic incentive for providing the service. In the future, TVs may also be directly connected to the Internet which would allow them to participate in the coordination directly for the purpose of proclaiming their existence and location, and for the purpose of not being disturbed.

Wireless microphones can be solved similarly to TVs, in that a node connected to the Internet registers itself in the area where the microphones are operating. Initially, the node would negotiate a frequency to be used by the microphones. The node's resource allocator would then be responsible for not allowing others to use the frequency while the microphones are operating.

If a device is offline and is unable to register itself in the network to be discovered (discovery network), it may be protected by a third party system, such as a database. This third party system should register itself in the discovery network in the relevant coordination areas and respond to resource allocators on behalf of the node. Alternatively, resource allocators could be required to look up certain channels in a database before using them. This is done wherein some or all nodes in the P2P system act on behalf of one or more nodes stored in a separate system, such as a database and to provide fine grained information or only answer simple queries, such as if a set of radio parameters may interfere with other nodes in a given area or to exchange charging information for access to information or for access to certain frequencies for a time limited time period.

The type of information exchanged between the nodes may consist of one or more of the following information parameters:

- transmitter power and antenna properties for each available radio channel;
- receiver sensitivity and antenna properties for each available radio channel;
- geographical position;
- measured interference level and signal strength for each available radio channel;
- time stamp for when the exchanged information was created or updated;
- Internet protocol (IP) address;
- identity of radio transmitters and receivers;
- one or more geographical areas in which a transmitter or receiver may cause interference or may be disturbed or may want to coordinate with other nodes;
- transmission schedule.

The following paragraphs will describe resource allocation.

When a node has discovered all its neighbors, it will begin to allocate resources while the discovery protocol is continuously running because nodes move, cease to operate, a new node enters etc. This is not handled by the discovery protocol, but a separate abstraction that is referred to as the resource allocator. The main task or responsibility of the resource allocator is to execute the resource allocation algorithm and to provide support functions needed by the algorithm. FIG. 2 shows the relationship between the discovery protocol and the resource allocator. As seen, it is up to the allocator to gather additional information from the neighbors after they have been identified. The specific communication protocol is outside the scope of this disclosure, but it is assumed that it is able to contact the nodes directly via their Internet connections or via a system representing them. The resource allocator is also responsible for configuring radio transmitter and/or receivers like selection of channel number and transmit power.

In the example of FIG. 2 the resource allocator is depicted as part of the same physical unit as the discovery mechanism. In another embodiment of the invention, the resource allocator may be located at another node, central entity or online server, and can perform the tasks of the resource allocation mechanism based on neighbour information relayed from the discovery mechanism residing within each node.

Figure 4:
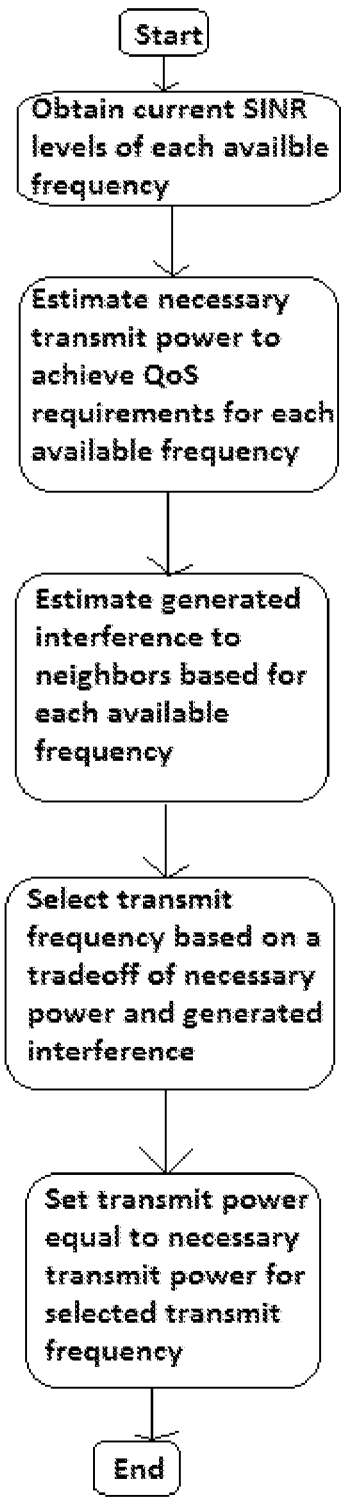
FIG. 4 illustrate the operations performed inside the Resource Allocator box in FIG. 2.

FIG. 4 describes the operations performed inside the "Resource Allocator" box in FIG. 2. Resource allocation is performed based on the information collected by the P2P discovery mechanism. In one design, with transmitter-receiver links, a transmitter can estimate the Signal to Interference plus Noise Ratio (SINR) at its receiver for one or more of its available channels from feedback from receiver of its current sensed SINR levels. In another design, a transmitter may estimate the SINR at its receiver for one or more of its available channels from neighbor information about transmit power and estimated channel gains based on location knowledge.

In one embodiment of the invention, the transmitter can estimate its necessary transmit power for one or more of its available channels based on the SINR knowledge and QoS requirements.

In another embodiment of the invention, the transmitter may use static transmit power.

The resource allocation at radio transmitters and receivers nodes consists of one or more of the following operations:
   estimating necessary transmission power level to achieve quality of service requirements for one or more of the available radio channels;
   estimating generated interference to neighbor receivers for one or more of the available radio channels;
   selecting transmission radio channel based on a trade-off between necessary transmit power level and generated interference;
   setting transmission power level equal to the necessary power level for chosen transmission channel or channels or subcarriers.

Based on neighbor information, such as neighbor location, the transmitter can estimate the power level of interference it creates at neighboring receiver nodes. From this calculation it can select transmit channel based on a tradeoff between necessary power or received SINR and interference it creates at neighboring receiver nodes. For example, such a function to determine this tradeoff can be expressed as:

$$U_i(k) = -\sum_{j \in T_i, j \neq i} p_j(k) g_{ji}(k) - \sum_{j \in R_i, j \neq i} p_j^{nec}(k) g_{ij}(k) l(p_j(k)) \quad \text{Eq (2)}$$

where $T_i$ are the neighboring transmitters most relevant to i, $R_i$ are all relevant neighboring receivers to i, $p_j(k)$ is transmitter j's transmit power on channel k, $g_{ji}(k)$ is the path loss between transmitter j and receiver i on channel k, $P_i^{nec}(k)$ is transmitter i's necessary transmit power to achieve its QoS requirements on channel k, $g_{ji}(k)$ is the path loss between transmitter i and receiver j and $l(p_j(k))$ is a function such that $l(p_j(k))=1$ if $p_j(k)>0$ and $l(p_j(k))=0$ otherwise. In this example transmit frequency is determined by:

$$k^* = \arg\max_{k \in C} U_i(k)$$

where C is the set of all available channels to i. Transmit power is then set to the necessary transmit power for channel k*.

In another embodiment of the invention, antenna gain and radiation pattern may be included in the selection of transmit frequency and power.

In yet another embodiment of the invention, where nodes consists of access points and wireless devices (users) connected to the access points, the access points can calculate the worst case received power at any user based on its coverage area. Transmit power at the access points may be fixed, or may be controlled to satisfy QoS requirements in the worst case (cell edge). From information obtained about its neighbors, the access point can estimate its worst case generated interference to the coverage area of neighboring access points for one or more of its available channels, and then select transmit channel based on a trade-off between necessary power or received SINR at the cell edge and interference it creates at neighboring access points.

The invention claimed is:

1. A method using a network and network resources for discovering and coordinating radio devices connected to a backhaul network for the purpose of controlling interference and coordinating wireless communication between receiver and/or transmitter nodes, said method comprises:
   from each node collecting information related to neighboring receiver and or transmitter nodes by peer-to-peer (P2P) communication over the backhaul network,
   determining relevant interfering neighboring receiver and or transmitter nodes for transmission from each node,
   using the discovery mechanism for radio nodes with access to the network to allocate radio resources on behalf of a set of offline radio nodes that are not connected to the backhaul network for future use of these radio nodes, and
   performing resource management for receiver and or transmitter nodes discovered by this method.

2. The method according to claim 1, wherein each receiver and/or transmitter node maintain a list of the most relevant neighboring receiver and/or transmitter nodes determined by how likely it is that they will interfere with other radio transmissions in a given geographical area, and where this ordered list is created by:
   at certain intervals choosing an approximate random sample of nodes in the network topology calculating their relevance in terms of interfering with the node, and storing a list of the most relevant information from the most relevant transmitter and/or receiver nodes, and
   at certain intervals contacting the most relevant or a subset of the most relevant receiver and/or transmitter nodes from which information is maintained in said list and exchanging information parameters about other relevant nodes, and selecting a subset of the nodes about which information shall be exchanged based on relevance if the number of relevant nodes maintained in said list is large.

3. The method according to claim 2, wherein the nodes exchange one or more of the following information parameters:
   transmitter power and antenna properties for each available radio channel;
   receiver sensitivity and antenna properties for each available radio channel;
   geographical position;
   measured interference level and signal strength for each available radio channel;

time stamp for when the exchanged information was created or updated;
Internet protocol (IP) address;
identity of radio transmitters and receivers;
one or more geographical areas in which a transmitter or receiver may cause interference or may be disturbed or may want to coordinate with other nodes;
transmission schedule.

4. The method according to claim 1, wherein nodes that are TV receivers and/or wireless microphones that are primary users of the radio frequencies are protected by inclusion in the P2P network or the inclusion of a node acting on their behalf, and exchanging of radio parameters.

5. The method according to claim 1, wherein some or all nodes in the P2P system act on behalf of one or more nodes stored in a separate system, such as a database and to provide fine grained information or only answer simple queries, such as if a set of radio parameters may interfere with other nodes in a given area or to exchange charging information for access to information or for access to certain frequencies for a time limited time period.

6. The method according to claim 1, wherein one or more of the following nodes are included in the P2P network for exchange of one ore more of the following radio parameters:
   Wi-Fi (IEEE 802.11) access points and other wireless access points including the base and the distribution system service of IEEE 802.11;
   WRAN (IEEE 802.22) base stations for operation in the TV white spaces;
   femtocells (LTE and UMTS) and base stations for mobile telephones including access network discovery information and selection function of 3GPP networks, and
   wireless devices or base stations which contain radio transmitters and receivers are included in the P2P network for exchange of radio parameters.

7. The method according to claim 1, wherein the discovery mechanism and the resource allocation are performed on separate or the same device.

8. The method according to claim 1, wherein resource allocation for radio transmitters and/or receiver nodes comprises one or more of the following operations:
   estimating necessary transmission power level to achieve quality of service requirements for one or more of the available radio channels;
   estimating generated interference to neighbor receivers for one or more of the available radio channels;
   selecting transmission radio channel or channels or subcarriers based on a trade-off between necessary transmit power level and generated interference;
   setting transmission power level equal to the necessary power level for chosen transmission channel or channels or subcarriers.

9. The method according to claim 1, wherein relevant neighboring nodes are determined by constructing geometric shapes approximating the transmission/receiving antenna transmission/interference areas and by computing to what extend the shapes overlap, which may include one or more of the following methods:
   relevant interfering neighboring nodes are determined in a two-dimensional space by constructing a circular coordination area around each node and computing to what extent the circular coordination areas overlap;
   relevant interfering neighboring transmitter and/or receiver nodes are determined in a three-dimensional space by constructing a circular coordination volume around each node and computing to what extent the circular coordination volumes overlap;
   relevant interfering neighboring nodes are determined in a two-dimensional space by constructing polygons based on their transmission/receiving antenna directionality and computing to what extent the polygons overlap;
   relevant interfering neighboring nodes are determined in a three-dimensional space by constructing polygons based on their transmission/receiving antenna directionality and computing to what extent the polygons overlap;
   relevant interfering neighboring nodes are determined based on transmission schedules.

\* \* \* \* \*